(12) United States Patent
Kim

(10) Patent No.: US 7,611,162 B2
(45) Date of Patent: Nov. 3, 2009

(54) FRONT PILLAR TRIM MOUNTING STRUCTURE FOR VEHICLES

(75) Inventor: Yong Chae Kim, Seoul (KR)

(73) Assignee: Kia Motors Corporation, Seoul (KR)

( * ) Notice: Subject to any disclaimer, the term of this patent is extended or adjusted under 35 U.S.C. 154(b) by 342 days.

(21) Appl. No.: 11/298,413

(22) Filed: Dec. 8, 2005

(65) Prior Publication Data

US 2007/0080524 A1 Apr. 12, 2007

(30) Foreign Application Priority Data

Oct. 11, 2005 (KR) ...................... 10-2005-0095510

(51) Int. Cl.
  *B60R 21/21* (2006.01)
  *B60R 21/213* (2006.01)
  *B60R 21/215* (2006.01)

(52) U.S. Cl. ............. 280/728.2; 280/728.1; 280/730.2; 296/1.02; 296/1.08; 296/39.1; 296/187.05; 296/193.06

(58) Field of Classification Search ............. 280/728.2, 280/730.2, 728.1; 296/1.02, 1.08, 39.1, 187.05, 296/193.06
See application file for complete search history.

(56) References Cited

U.S. PATENT DOCUMENTS

| | | | | |
|---|---|---|---|---|
| 6,082,761 | A * | 7/2000 | Kato et al. | 280/730.2 |
| 6,129,375 | A * | 10/2000 | Adomeit | 280/730.1 |
| 6,333,515 | B1 * | 12/2001 | Kubota et al. | 280/730.2 |
| 6,361,069 | B1 * | 3/2002 | Saito et al. | 280/730.2 |
| 6,460,879 | B2 * | 10/2002 | Tanase et al. | 280/730.2 |
| 6,485,048 | B2 * | 11/2002 | Tajima et al. | 280/728.2 |
| 6,502,854 | B2 * | 1/2003 | Mueller | 280/730.1 |
| 6,616,222 | B1 * | 9/2003 | Ponceau | 296/214 |
| 6,685,257 | B1 * | 2/2004 | Beland et al. | 296/187.05 |
| 6,761,374 | B2 * | 7/2004 | Di Sante et al. | 280/728.2 |
| 6,808,198 | B2 * | 10/2004 | Schneider et al. | 280/730.1 |
| 6,874,809 | B1 * | 4/2005 | Hahnekamp et al. | 280/728.3 |
| 7,172,209 | B2 * | 2/2007 | Totani et al. | 280/728.2 |
| 7,240,914 | B1 * | 7/2007 | Kamano et al. | 280/728.2 |
| 7,445,233 | B2 * | 11/2008 | McKimson | 280/730.2 |
| 2003/0178821 | A1 * | 9/2003 | Schneider et al. | 280/730.2 |
| 2004/0061316 | A1 * | 4/2004 | Elqadah et al. | 280/730.2 |
| 2004/0075250 | A1 * | 4/2004 | Choi | 280/728.3 |
| 2005/0052001 | A1 * | 3/2005 | Totani et al. | 280/728.2 |
| 2005/0087961 | A1 * | 4/2005 | Lee | 280/728.2 |
| 2007/0108742 | A1 * | 5/2007 | Itakura | 280/728.3 |
| 2007/0126215 | A1 * | 6/2007 | Choi | 280/730.2 |

(Continued)

FOREIGN PATENT DOCUMENTS

JP 10-29458 11/1998

(Continued)

*Primary Examiner*—Christopher Ellis
*Assistant Examiner*—Barry Gooden, Jr.
(74) *Attorney, Agent, or Firm*—Edwards Angell Palmer & Dodge LLP; Peter F. Corless

(57) ABSTRACT

A front pillar trim structure for a curtain airbag in a vehicle is disclosed. In preferred configurations, the front pillar trim structure comprises a handle mounted on a front pillar trim so that a passenger can conveniently use the handle when entering or exiting a vehicle, and wherein the front pillar trim is adapted to be moved effectively by the expansion force of the curtain airbag without being destroyed when a vehicular collision occurs.

10 Claims, 4 Drawing Sheets

U.S. PATENT DOCUMENTS

| | | | |
|---|---|---|---|
| 2007/0132212 A1* | 6/2007 | Davey et al. | 280/728.3 |
| 2007/0200380 A1* | 8/2007 | Stolarczyk et al. | 296/1.02 |
| 2007/0222192 A1* | 9/2007 | Yamagiwa et al. | 280/730.2 |
| 2008/0001384 A1* | 1/2008 | Catron et al. | 280/730.2 |

FOREIGN PATENT DOCUMENTS

| | | |
|---|---|---|
| JP | 2000-052905 | 2/2000 |
| JP | 2001-322525 | 11/2001 |

\* cited by examiner

FRONT PILLAR TRIM MOUNTING STRUCTURE FOR VEHICLES

CROSS-REFERENCE TO RELATED APPLICATION

This application claims priority to and the benefit of Korean Patent Application 10-2005-0095510 filed in the Korean Intellectual Property Office on Oct. 11, 2005, the entire content of which is incorporated herein by reference.

FIELD OF THE INVENTION

The present invention relates to a front pillar trim structure for a curtain airbag, which has a handle mounted on a front pillar trim, so as to be conveniently used by a passenger when entering or exiting the vehicle, and can enable, at the time of a vehicle collision, the front pillar trim to operate effectively without being destroyed by the expansion force of the curtain airbag.

BACKGROUND

In general, an airbag system is a safety device for protecting a passenger, in which an impact, at the time of a vehicle collision, is sensed by a sensor installed in the vehicle body and inputted to a microcomputer, where the microcomputer determines whether to deploy the airbag or not on the basis of impact severity. If it is determined that an operation for deploying the airbag is needed, the microcomputer sends an electric signal to an inflator, so that a gas generating agent is burnt so as to expand the airbag, thereby protecting the passenger.

The airbag restrains the head and chest of the passenger, thereby protecting the passenger from secondary collision with the steering wheel or the wind shield of the vehicle; although the time for deploying the airbag may vary depending on the type and velocity of the vehicle collision, the time required for determining the collision from the collision is about 10 ms and the airbag should be fully deployed and expanded within a very short time of 30 to 40 ms after the electric signal is outputted.

The airbag system is required to be highly reliable in operation in view of the fact that the airbag system must operate to assure the deployment and expansion of the airbag when a vehicular accident occurs, whereas the airbag system should not operate when the deployment or expansion of the airbag is not necessary.

In addition, when a lateral collision of the vehicle occurs, the roof side rail area is often severely deformed and protrudes into the cabin of the vehicle. Due to this, the head of the passenger may be seriously injured. In order to prevent such injury, curtain airbags are installed along the entire roof liner area of the vehicle.

At the time of operation, such a curtain airbag shall be deployed and expanded without destroying the front pillar trim. However, according to prior systems, at the time when such a curtain airbag is deployed and expanded, the head lining is deformed, while the front pillar trim is not deformed. Accordingly, there is a problem in that the front pillar trim is destroyed by the expansion force of the curtain airbag.

The front pillar trim is destroyed because the head lining is firstly deformed and then front pillar trim is deformed as the expanding velocity of the curtain airbag is higher at the head lining area than at the front pillar trim area.

To attempt to address this problem, there has been employed a structure in which the head lining can push the front pillar trim simultaneously being deformed at the time when the curtain airbag is deployed. However, as a handle is provided on the front pillar trim area, the handle hinders the front pillar trim from being moved and separated from the associated parts. As a consequence, a problem occurs whereby the curtain airbag may not be deployed.

Because it is a general tendency that SUV's (Sports Utility Vehicles) currently coming on the market are provided with a handle on a front pillar trim area, what is needed are complementary measures for enabling the curtain airbag to operate effectively, as well as for enabling the handle to be conveniently used by a passenger when entering or exiting a vehicle.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, a front pillar trim structure for a curtain airbag is provided, which can be enable the curtain airbag to be effectively deployed at the time of a vehicle collision while retaining the function of a handle mounted on a front pillar trim.

In a first preferred aspect, a front pillar trim structure for a curtain airbag is provided that may comprise in preferred aspects: (i) an inner pillar panel; (ii) a handle associated with the inner pillar panel; and (iii) a front pillar trim positioned in front of the inner pillar panel.

In one preferred system, there is provided a front pillar trim structure comprising: an inner pillar panel provided with plural ridges which are spaced from each other with an interval, and a handle installed to the ridges, preferably configured so that a passenger can grasp the handle.

The handle is also preferably provided with fixing members so that the handle can be fixedly installed to the ridges.

A cover plate formed from a soft material is preferably interposed between the ridges and the handle. The cover plate is preferably but not exclusively formed from various polymers and composites including poly vinyl chloride.

The cover plate preferably has a dimension or configuration allowing the handle to be mounted on the cover plate.

A front pillar trim positioned in front of the inner pillar panel is connected with a head lining, and a seating hole is formed in the front pillar trim to receive the cover plate, whereby the front pillar trim can be separated from the head lining and the inner pillar panel by the expansion force of the curtain airbag.

The cover plate may be formed with stepped portions along the edges of the outer surface thereof, so that the front pillar trim can be continuously engaged with cover plate as the edge areas of the seating hole formed in front pillar trim are fitted in the stepped portions of the cover plate.

The invention also includes vehicles particularly motor vehicles such as automobiles, trucks and the like that comprise front pillar trim structure as described herein.

It is understood that the term "vehicle" or "vehicular" or other similar terms as used herein is inclusive of motor vehicles in general such as passenger automobiles including sports utility vehicles (SUV), buses, trucks, various commercial vehicles, and the like.

Other aspects of the invention are discussed below.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
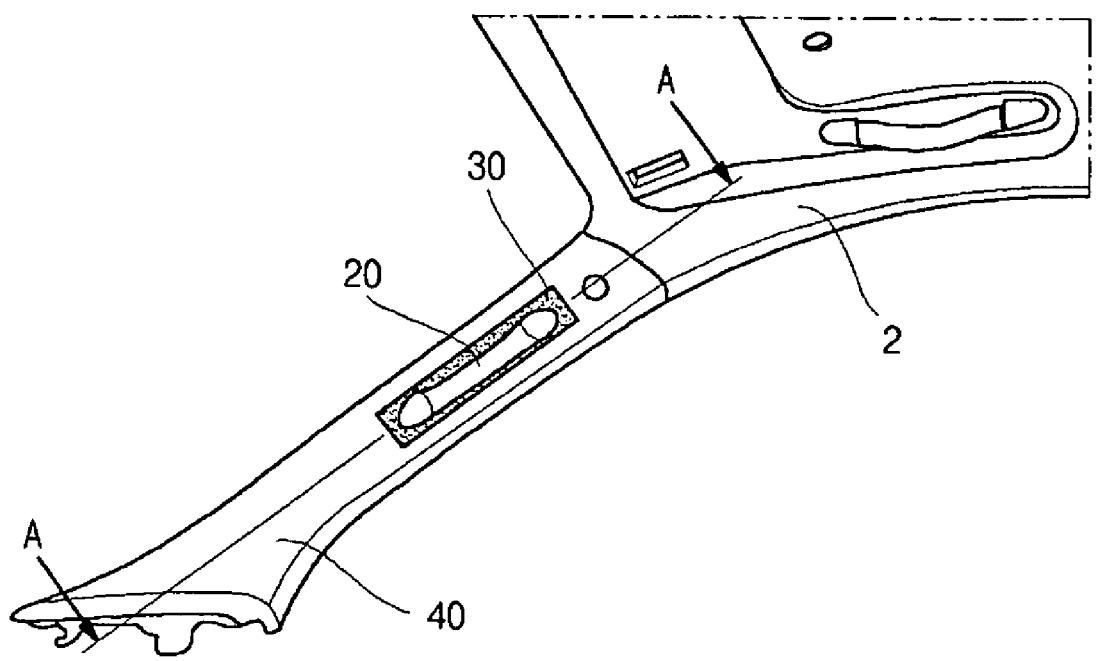
FIG. 1 shows the inventive front pillar trim structure for a curtain airbag in the installed state.

As discussed above, a front pillar trim structure for a curtain airbag is provided that may comprise in preferred aspects: (i) an inner pillar panel; (ii) a handle associated with the inner pillar panel; and (iii) a front pillar trim positioned in front of the inner pillar panel. Preferably, the front pillar trim structure also may include a cover plate associated with the inner pillar panel and the handle. For example, the inner pillar panel may comprise a plurality of spaced ridges. The handle element may be suitably installed by contacting such plurality of ridges. Preferably, the front pillar trim may comprise a seating hole which can receive the cover plate. In use, in preferred configurations, the front pillar trim can be separated effectively from the inner pillar panel by the expansion force of a curtain airbag.

A preferred embodiment of the present invention will be described with reference to the accompanying drawings. In the following description and drawings, the same reference numerals are used to designate the same or similar components, and so repetition of the description on the same or similar components will be omitted.

Figure 2:
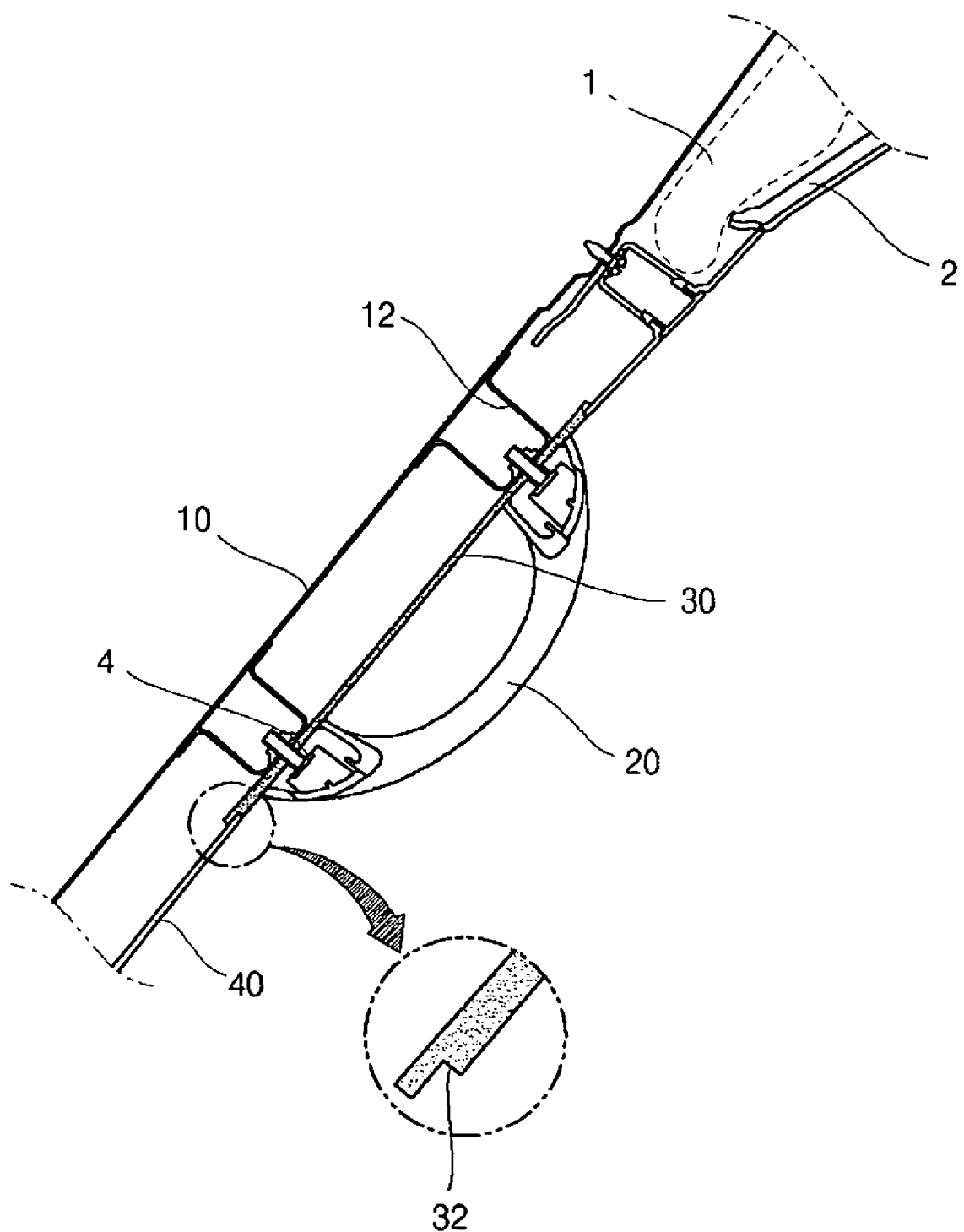
FIG. 2 is a cross-sectional view taken along line A-A.
Figure 3:
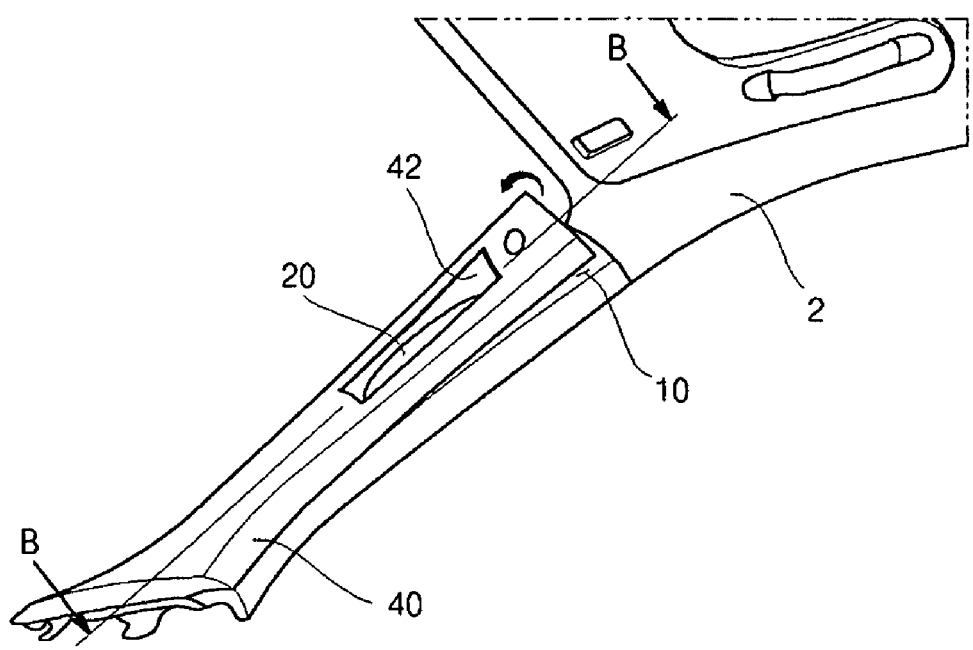
FIG. 3 shows an operating condition of the inventive front pillar trim structure for a curtain airbag.

Referring to FIGS. 1 to 3, a curtain airbag 1 is suitably installed between an inner pillar panel 10 and a head lining 2, and plural ridges 12 are positioned on the inner side of the inner pillar panel 10 with an interval being provided between them.

A handle 20 is suitably installed to the ridges 12 of the inner pillar panel 10, so that a passenger can grasp the handle 20 when entering or exiting the vehicle, in which the handle 20 is positioned on a front pillar trim 40.

The handle 20 is preferably formed in such a construction or configuration to readily allow a passenger to insert his or her hand into a space defined by the handle 20.

It is preferable that the ridges 12 are spaced from each other by a distance suitable for mounting the handle 20.

The handle 20 is suitably provided with fixing elements 4 to fix the handle 20 to the ridges 12. It is preferable that screws are used as the fixing elements 4, in which the screws are fixed to the ridges 20 and the heads of the screws are inserted into the opposite ends of the handle 20 so that they do not protrude outward.

The handle 20 is suitably poisoned on the longitudinal upper part of the front pillar trim 40 so that the passenger can readily enter or exit the vehicle.

A cover plate 30 preferably formed from a soft material is suitably interposed between the ridges 12 and the handle 20. Preferably, cover plate 30 is formed from poly vinyl chloride, although the cover plate 30 may be formed from a variety of other materials. In addition, the cover plate 30 preferably has dimensions or configuration such that the handle 20 can be effectively mounted on the cover plate 30.

The inner pillar panel 10 positioned in front of the inner pillar trim 40 is suitably connected with the head lining 2, and a seating hole 42 for receiving the cover plate 30 is formed in the front pillar trim 40.

The front pillar trim 40 preferably has plural connection pins on the inside thereof, so that the front pillar trim 40 can be mounted on the inner pillar panel 10.

In one preferred design, the cover plate 30 may be formed with stepped portions along the edges of the outer surface thereof, so that the front pillar trim 40 can be continuously engaged with cover plate 30, as the edge areas of the seating hole 42 formed in front pillar trim 40 are fitted in the stepped portions of the cover plate 30.

The use of a preferred front pillar trim structure for a curtain airbag configured as described above is now explained in more detail with reference to the drawings.

Referring to FIGS. 1 and 2, the head lining 2 and the front pillar trim 40 are installed, as shown in the drawings, and the handle 20 is suitably mounted on the front pillar trim 40.

In a vehicle such as a passenger car or a Sports Utility Vehicle (SUV), the handle 20 is suitably mounted on the front pillar trim 40 as an assistant member adapted to be grasped by a passenger entering or exiting the vehicle, so that the passenger can more conveniently get in or out of the vehicle.

As shown in FIG. 2, which is a cross-sectional view taken along line A-A of FIG. 1, the outer surface of the cover plate 30 is formed with the stepped portions 32, so that the external appearance is aesthetically pleasing when viewed from the interior of the cabin of the vehicle, even if the edge portion of the seating hole 42 formed in the front pillar trim 40 (see FIG. 3) are fitted in the stepped portions 32.

If a vehicular collision accident occurs, the curtain airbag system operates. Such operation of the curtain airbag being deployed while moving the front pillar trim by the expansion force of the curtain airbag is now described.

Referring to FIG. 3, if the vehicle is subjected to a lateral collision or overturned while being driven on a road, a sensor (not shown) senses the collision and outputs a collision signal so that the curtain airbag 1 begins to expand.

The expansion force produced while the curtain airbag 1 is deployed is firstly exerted to the front pillar trim 40, thereby moving the front pillar trim 40 in the direction indicated by arrow in FIG. 3, so that the front pillar trim 40 mounted on the inner pillar 5 panel 10 is separated starting from the area thereof adjacent to the head lining 2.

Figure 4:
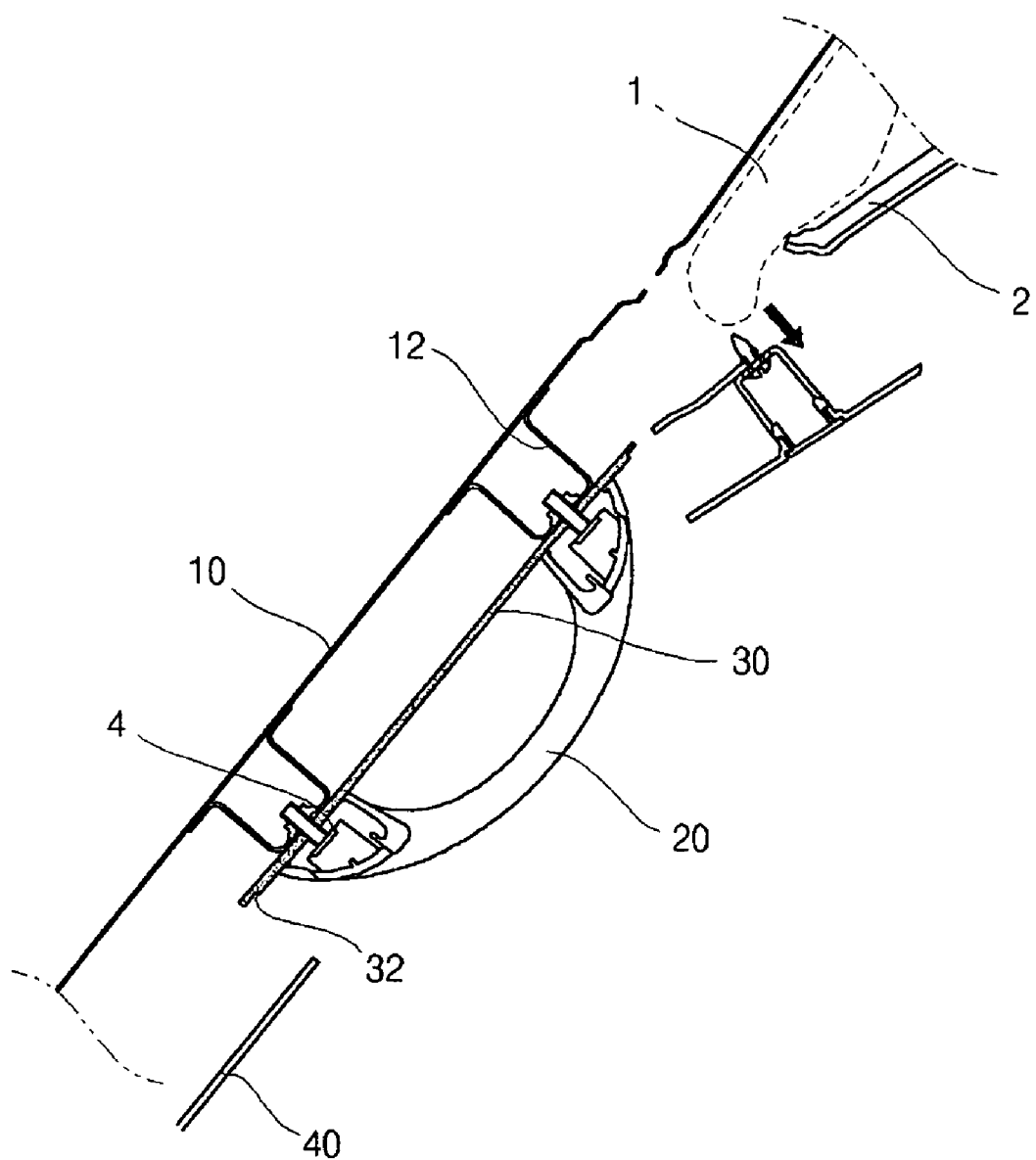
FIG. 4 is a cross-sectional view taken along line B-B.

Referring to FIG. 4, while the expansion force of the curtain airbag 1 causes the front pillar trim 40 to be moved, the curtain airbag 1 is continuously expanded.

Even if the front pillar trim 40 is continuously moved thereby, the cover plate 30 and the handle 30 mounted on the ridges 12 are held in a fixed condition on the ridges 12 regardless of the movement of the front pillar trim 40.

Since the cover plate 30 is preferably formed from a soft material such as an appropriate polymeric material, the front pillar trim 40 can be moved without any deformation of the seating hole 42 formed in the front pillar trim 40 even if the front pillar trim 40 is instantly and rapidly moved.

As the front pillar trim 40 is sufficiently separated from the inner pillar panel 10, the curtain airbag 1 is rapidly deployed through the open area between the front pillar trim 40 and the inner pillar trim panel 10, thereby minimizing any potential of injury of a passenger in the vehicle.

During such movement, the front pillar trim 40 is moved but not completely broken away from the inner pillar panel 10, thereby preventing the passenger from being injured by the broken front pillar trim 40.

As described above, the preferred front pillar trim structures for a curtain airbag can ensure that the curtain airbag can be effectively operated in the state in which the handle is mounted on the front pillar trim.

In addition, preferred front pillar trim structure for a curtain airbag can enhance the reliability of a vehicle because the curtain airbag can be deployed without destroying the front pillar trim, thereby minimizing the possibility of a passenger in the vehicle from being secondarily injured by the destroyed front pillar trim.

Moreover, because any gap or inner component adjacent or within the handle area mounted on the front pillar trim is not exposed to the interior of the cabin of the vehicle, the aesthetic appearance of the vehicle can be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A front pillar trim structure for a curtain airbag comprising:
    an inner pillar panel provided with plural ridges which are spaced from each other with a predetermined interval;
    a handle installed to the ridges;
    a cover plate interposed between the ridges and the handle; and
    a front pillar trim positioned in front of the inner pillar panel and connected with a head lining, the front pillar trim having a seating hole formed to receive the cover plate, in which the front pillar trim can be separated from the head lining and the inner pillar panel by the expansion force of the curtain airbag,
    wherein the cover plate and the handle are configured to be passed through the seating hole when the front pillar trim is separated from the inner pillar panel at the expansion of the curtain airbag.

2. A front pillar trim structure as claimed in claim 1, wherein the cover plate has a configuration allowing the handle to be mounted on the cover plate.

3. A front pillar trim structure as claimed in claim 1, wherein the cover plate is formed from a soft material.

4. A front pillar trim structure as claimed in claim 1, wherein plural fixing members are provided on the handle, so that the handle can be fixedly installed to the ridges.

5. A front pillar trim structure as claimed in claim 1, the cover plate is formed with stepped portions along the edges of the outer surface thereof so that the front pillar trim can be continuously engaged with cover plate as the edge areas of the seating hole formed in the front pillar trim are fitted in the stepped portions of the cover plate.

6. A vehicle comprising a front pillar trim structure of claim 1.

7. A front pillar trim structure for a curtain airbag comprising:
    an inner pillar panel;
    a handle associated with the inner pillar panel;
    a cover plate associated with the inner pillar panel and the handle; and
    a front pillar trim positioned in front of the inner pillar panel,
    wherein the front pillar trim comprises a seating hole formed to receive the cover plate,
    wherein the cover plate and handle are configured to be passed through the seating hole when the front pillar trim is separated from the inner pillar panel at the expansion of the curtain airbag.

8. The front pillar trim structure of claim 7 wherein the front pillar trim is connected with a head lining to the inner pillar panel.

9. The front pillar panel of claim 7 wherein the front pillar trim can be separated from the inner pillar panel by the expansion force of a curtain airbag.

10. A vehicle comprising a front pillar trim structure of claim 7.

* * * * *